(12) United States Patent
Kim et al.

(10) Patent No.: US 10,981,341 B2
(45) Date of Patent: Apr. 20, 2021

(54) MOLDED OBJECT AND METHOD FOR MANUFACTURING THE SAME

(71) Applicant: LG Hausys, Ltd., Seoul (KR)

(72) Inventors: Won Kim, Incheon (KR); Myung Lee, Gyeonggi-do (KR); Dayoung Yu, Gyeonggi-do (KR); Jiwon Lim, Seoul (KR); Sang Hyun Rho, Gyeonggi-do (KR); Dongmin Song, Seoul (KR); Seongmoon Jung, Daejeon (KR)

(73) Assignee: LG Hausys, Ltd.

( * ) Notice: Subject to any disclaimer, the term of this patent is extended or adjusted under 35 U.S.C. 154(b) by 128 days.

(21) Appl. No.: 16/214,586

(22) Filed: Dec. 10, 2018

(65) Prior Publication Data

US 2019/0105853 A1    Apr. 11, 2019

Related U.S. Application Data

(63) Continuation-in-part of application No. PCT/KR2017/006082, filed on Jun. 12, 2017, which is a continuation-in-part of application No. PCT/KR2017/006085, filed on Jun. 12, 2017, which is a continuation-in-part of application No. PCT/KR2017/006079, filed on Jun. 12, 2017.

(30) Foreign Application Priority Data

| | | |
|---|---|---|
| Jun. 10, 2016 | (KR) | 10-2016-0072149 |
| Jun. 9, 2017 | (KR) | 10-2017-0072691 |
| Jun. 9, 2017 | (KR) | 10-2017-0072704 |
| Jun. 9, 2017 | (KR) | 10-2017-0072737 |
| Jun. 9, 2017 | (KR) | 10-2017-0072748 |
| Jun. 9, 2017 | (KR) | 10-2017-0072767 |

(51) Int. Cl.

| | |
|---|---|
| *B29C 70/10* | (2006.01) |
| *B32B 7/12* | (2006.01) |
| *B32B 3/26* | (2006.01) |
| *B32B 15/14* | (2006.01) |
| *B32B 5/18* | (2006.01) |
| *E04C 2/16* | (2006.01) |
| *B32B 15/04* | (2006.01) |
| *C08L 67/02* | (2006.01) |
| *B29K 105/08* | (2006.01) |
| *B29K 267/00* | (2006.01) |

(52) U.S. Cl.
CPC ............. *B29C 70/10* (2013.01); *B32B 3/26* (2013.01); *B32B 5/18* (2013.01); *B32B 7/12* (2013.01); *B32B 15/04* (2013.01); *B32B 15/14* (2013.01); *C08L 67/02* (2013.01); *E04C 2/16* (2013.01); *B29K 2105/0854* (2013.01); *B29K 2267/00* (2013.01); *C08L 2205/025* (2013.01); *C08L 2205/16* (2013.01)

(58) Field of Classification Search
CPC .......... E04C 2/16; D04H 1/435; D04H 1/541; D04H 1/558; C08L 2205/025; C08L 2205/16; C08L 67/00; C08L 67/02; C08L 67/025; C08L 67/03; B32B 15/00; B32B 15/08; B32B 15/082; B32B 15/085; B32B 15/088; B32B 15/09; B32B 15/092; B32B 15/095; B32B 15/098; B32B 15/04; B32B 15/14; B32B 7/12; B32B 5/18; B32B 5/20; B32B 3/26; B32B 7/14; B29K 2267/00; B29K 2267/003; B29K 2267/006; B29K 2267/04; B29K 2267/043; B29K 2267/046; B29K 2267/06; B29K 2105/0854; B29K 2105/0809; B29K 2105/08; B29C 70/00; B29C 70/02; B29C 70/021; B29C 70/04; B29C 70/06; B29C 70/10
See application file for complete search history.

(56) References Cited

U.S. PATENT DOCUMENTS

| | | | |
|---|---|---|---|
| 6,080,495 | A | 6/2000 | Wright |
| 6,171,705 | B1 | 1/2001 | Clifford |
| 6,855,432 | B1 | 2/2005 | Hojabr et al. |
| 2006/0141260 | A1 | 6/2006 | Haque et al. |
| 2007/0207301 | A1 | 9/2007 | Hanks et al. |
| 2008/0248278 | A1 | 10/2008 | Fisher et al. |
| 2008/0299367 | A1 | 12/2008 | Yamamoto |
| 2009/0130939 | A1* | 5/2009 | Kimura ............... D04H 13/00 |
| 2009/0317591 | A1 | 12/2009 | Sato et al. |

(Continued)

FOREIGN PATENT DOCUMENTS

| | | |
|---|---|---|
| CN | 101410564 A | 4/2009 |
| EP | 2889438 A1 | 7/2015 |

(Continued)

OTHER PUBLICATIONS

Database WPI Week 200925 Thomson Scientific, London, GB; AN 2009-F01334, XP002796659.

(Continued)

*Primary Examiner* — Christopher M Rodd

(74) *Attorney, Agent, or Firm* — Lerner, David, Littenberg, Krumholz & Mentlik, LLP

(57) ABSTRACT

The present invention relates to a molded object and a method for manufacturing the same. The molded object according to the present invention has high density and enhanced properties such as flexural strength or tensile strength, has a small weight change caused by moisture absorption even when used for a long period of time, and has small changes in flexural strength, tensile strength and the like, and therefore, is suited to be used as household materials, industrial materials or the like.

25 Claims, 2 Drawing Sheets

(56) References Cited

U.S. PATENT DOCUMENTS

| | | | |
|---|---|---|---|
| 2010/0040902 A1 | 2/2010 | Mizrahi | |
| 2011/0108218 A1 | 5/2011 | Flack | |
| 2015/0175801 A1 | 6/2015 | Kim | |
| 2016/0023440 A1 | 1/2016 | Irazu Echeverria et al. | |
| 2017/0119226 A1* | 5/2017 | Nakayama | A47L 13/16 |
| 2017/0305783 A1 | 10/2017 | Faynot et al. | |
| 2018/0190532 A1 | 7/2018 | Sugiyama et al. | |
| 2019/0071265 A1 | 3/2019 | Masuda et al. | |

FOREIGN PATENT DOCUMENTS

| | | | |
|---|---|---|---|
| JP | 2006192800 A | 7/2006 | |
| JP | 2010215825 A | 9/2010 | |
| JP | 2013063605 A | 4/2013 | |
| JP | 2015068485 A | 4/2015 | |
| JP | 2015071794 A | 4/2015 | |
| KR | 20070107015 A | 11/2007 | |
| KR | 100850765 B1 | 8/2008 | |
| KR | 20090009222 A | 1/2009 | |
| KR | 20090068256 A | 6/2009 | |
| KR | 20110125889 A | 11/2011 | |
| KR | 101465595 B1 | 11/2014 | |
| KR | 101500036 B1 | 3/2015 | |
| KR | 101744794 B1 | 6/2017 | |
| KR | 20170077985 A | 7/2017 | |
| KR | 20170140111 A | 12/2017 | |
| TW | 201343407 A | 11/2013 | |
| WO | 2008108295 A1 | 9/2008 | |
| WO | 2014083200 A1 | 6/2014 | |
| WO | WO-2015194563 A1 * | 12/2015 | D04H 1/4334 |

OTHER PUBLICATIONS

Extended European Search Report including Written Opinion for Application No. EP17810600 dated Jan. 24, 2020.
Search Report from 1st Office Action for Chinese Application No. 201780049038.X dated Apr. 27, 2020; 2 pages.
Songhan Plastic Technology Co, "DuPont BYNEL 4003", http://www.lookpolymers.com/polymer_DuPont-Bynel-4003-Anhydride-Modified-HDPE-Adhesive-Resin-nbspdiscontinued-.php (Year: 2020), 2 pages.
PolymerProcessing.com, "PET Properties", poly(ethylene terephthalate), 2000, http://www.polymerprocessing.com/polymers/PET.html (Year: 2000), 2 pages.
Songhan Plastic Technology Co, "DuPont BYNEL 4206", http://www.lookpolymers.com/polymer_DuPont-Bynel-4206-Anhydride-Modified-LDPE-Adhesive-Resin.php (Year: 2020), 2 pages.
MatWeb, "Overview of materials for EVOH", http://www.matweb.com/search/datasheettextaspx?matguid=744899e4ab06482da9cf86d8f450db0d (Year: 2015), 2 pages.
International Search Report for PCT/KR2017/006082 dated Sep. 20, 2017.
International Search Report for PCT/KR2017/006081 dated Sep. 20, 2017.
International Search Report for PCT/KR2017/006079 dated Sep. 20, 2017.
International Search Report for PCT/KR2017/006084 dated Sep. 20, 2017.
International Search Report for PCT/KR2017/006085 dated Sep. 20, 2017.
"Recycling of Polyethylene Terephthalate", G.P. Thomas, Jul. 24, 2012, AZO Cleantech, https://www.azocleantech.com/article.aspx?ArticleID=254 (Year:2012).

* cited by examiner

【Figure 1】
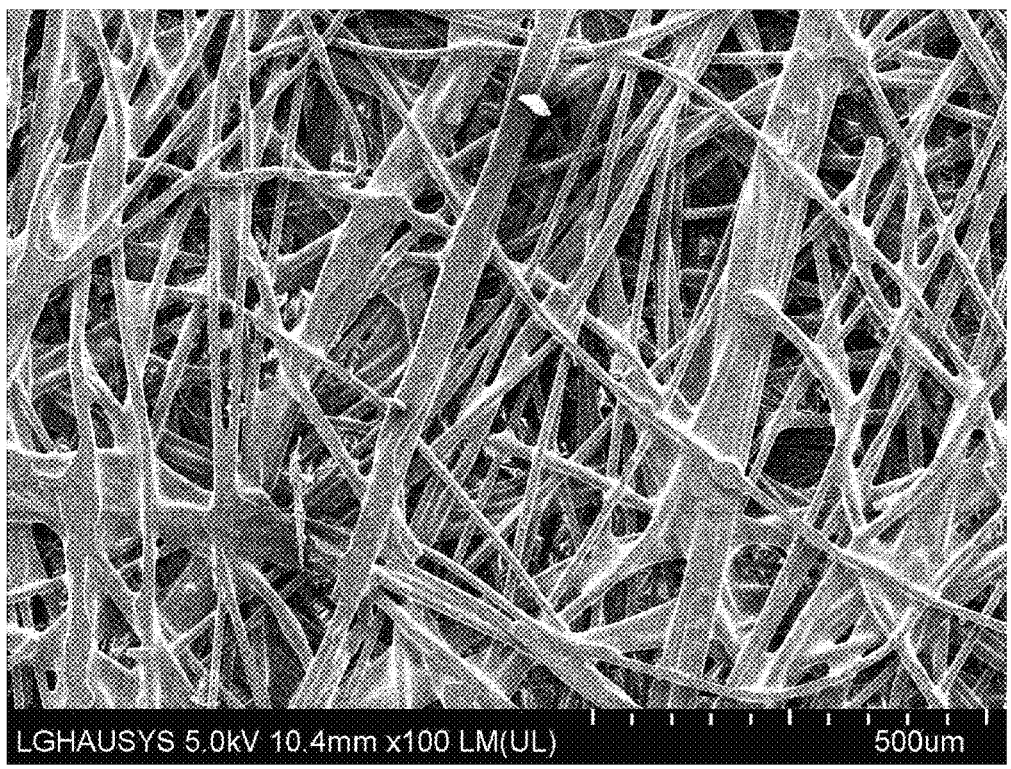
【Figure 2】
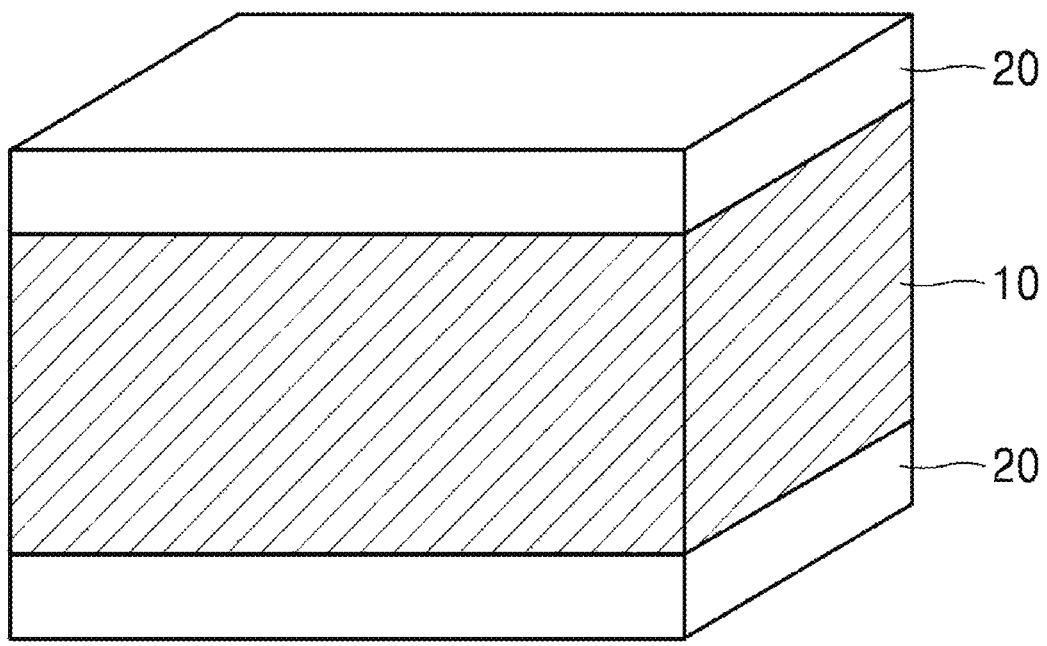

[Figure 3]
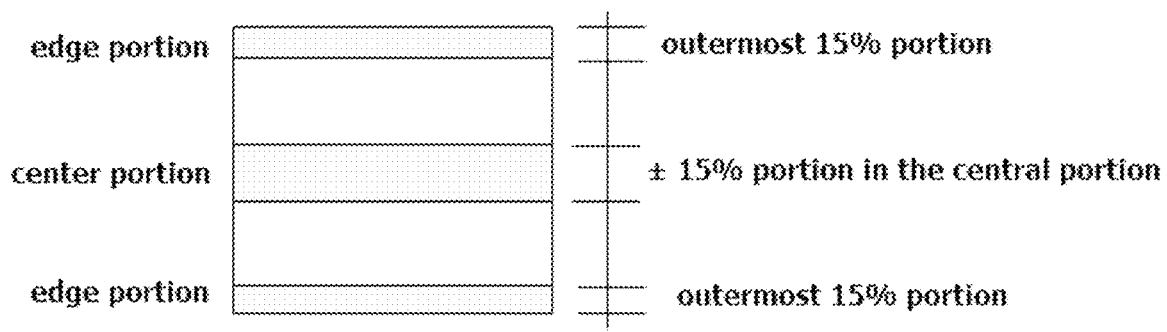

MOLDED OBJECT AND METHOD FOR MANUFACTURING THE SAME

CROSS-REFERENCE TO RELATED APPLICATIONS

This application is a continuation-in-part of International Application No. PCT/KR2017/006079, filed on Jun. 12, 2017, which claims priority from Korean Patent Application No. 10-2016-0072149, filed Jun. 10, 2016, Korean Patent Application No. 10-2017-0072691, filed Jun. 9, 2017, and Korean Patent Application No. 10-2017-0072704, filed Jun. 9, 2017. This application is also a continuation-in-part of International Application No. PCT/KR2017/006082, filed on Jun. 12, 2017, which claims priority from Korean Patent Application No. 10-2016-0072149, filed Jun. 10, 2016, and Korean Patent Application No. 10-2017-0072748, filed Jun. 9, 2017. This application is also a continuation-in-part of International Application No. PCT/KR2017/006085, filed on Jun. 12, 2017, which claims priority from Korean Patent Application No. 10-2016-0072149, filed Jun. 10, 2016, Korean Patent Application No. 10-2017-0072737, filed Jun. 9, 2017, and Korean Patent Application No. 10-2017-0072767, filed Jun. 9, 2017. The disclosures of all of the above applications are incorporated herein by reference.

This application relates to Korean Application No. 10-2017-0072687, filed on Jun. 10, 2016, and Korean Application No. 10-2017-0072754, filed on Jun. 10, 2016, the disclosures of which are hereby incorporated herein by reference.

TECHNICAL FIELD

The present invention relates to a molded object and a method for manufacturing the same.

BACKGROUND ART

Molded objects having a non-woven fiber structure have been widely used from household materials to industrial materials as well as used for sanitation or medical purposes such as disposable diapers.

Such molded objects having a non-woven fiber structure are manufactured using methods such as needle punch or hot air thermal bond, and are thereby flexible and light weight. However, hardness is low, and there have been difficulties when used in various fields from household materials to industrial materials.

In order to improve this, technologies manufacturing a molded object having a non-woven fiber structure that is relatively light while having structural rigidity close to metals by providing hardness using various methods have been diversely studied.

As methods for manufacturing such a molded object, a wet process in which a binder is mixed to a fiber, and then high temperature steam is sprayed for adhering, or the result is impregnated in a solution, and the like, has been used.

However, a molded object manufactured using such a wet process has low density and has poor properties such as flexural strength or tensile strength, and therefore, there have been problems in that the object is readily bent, torn or the like when a strong weight is applied from the outside, and properties sufficient to be used in household materials or industrial materials are difficult to secure.

In addition, in the case of being produced by a wet process, since many fibers are entangled due to the characteristics of nonwoven fibers, water vapor having heat energy is not sufficiently transferred to the interior of the molded object, resulting in a problem that properties are different between the outer surface of the molded object and the inner central portion.

In addition, when using such a molded object for a long period of time under a high temperature and high humidity environment, moisture penetrating into the molded object increases, and accordingly, properties that the molded object has, for example, flexural strength or tensile strength, decline causing a problem.

Furthermore, there has been a problem in that large quantities of moisture are absorbed into the molded object, and an effect of weight lightening may not be secured.

DISCLOSURE

Technical Problem

In view of the above, the inventors of the present invention have performed studies on molded objects having high density and enhanced properties such as flexural strength or tensile strength even after long-term use in a high temperature and high humidity environment by using a non-hygroscopic resin as a binder in a dry process instead of a wet process, and have completed the present invention as a result.

Accordingly, an aspect of the present invention provides a molded object having high density and enhanced properties such as flexural strength or tensile strength, and having no difference between the outer surface of the molded object and the inner central portion.

Another aspect of the present invention provides a molded object having a small weight change caused by moisture absorption even when used for a long period of time, and having small changes in flexural strength, tensile strength and the like.

Technical Solution

According to an aspect of the present invention, there is provided a molded object having a non-woven fiber structure, the molded object comprising: a polyester-based fiber; and a binder, wherein the binder is a non-hygroscopic copolymer resin, all or a part of the polyester-based fiber is fused by the binder, wherein natural pores are included inside the molded object, and the molded object has apparent density of 0.5 g/cm$^3$ to 0.8 g/cm$^3$.

Herein, the molded object may have flexural strength of 20 MPa to 60 MPa and tensile strength of 50 MPa to 80 MPa.

Herein, the molded object may have flexural modulus in a range of 1.0 GPa to 1.5 GPa, tension stiffness in a range of 1.0 GPa to 1.8 GPa, tensile elongation in a range of 10% to 30%, and peel-off strength in a range of 150 N to 200 N.

Herein, the molded object may have a weight change rate of less than 0.1% after keeping a constant temperature/constant humidity for 100 hours at a temperature of 85° C. and relative humidity of 85%.

Herein, the molded object may have a weight change rate of less than 0.08% after keeping a constant temperature/constant humidity for 100 hours at a temperature of 85° C. and relative humidity of 85%.

Herein, the molded object may have a flexural strength change rate of less than 10% after keeping a constant temperature/constant humidity for 100 hours at a temperature of 85° C. and relative humidity of 85%.

Herein, the molded object may have a flexural strength change rate of less than 5% after keeping a constant temperature/constant humidity for 100 hours at a temperature of 85° C. and relative humidity of 85%.

Herein, the molded object may have the difference in the density of the 15% outermost portion of the molded object in the thickness direction and the density of the ±15% portion in the center of the molded object in the thickness direction is less than 3%, and the difference between the bonded fiber ratio of the 15% outermost portion of the molded object in the thickness direction and the bonded fiber ratio of the ±15% portion in the center of the molded object in the thickness direction is less than 10%.

Herein, the molded object may have the difference in the density of the 15% outermost portion of the molded object in the thickness direction and the density of the ±15% portion in the center of the molded object in the thickness direction is less than 1%, and the difference between the bonded fiber ratio of the 15% outermost portion of the molded object in the thickness direction and the bonded fiber ratio of the ±15% portion in the center of the molded object in the thickness direction is less than 5%.

Herein, the molded object may have the difference in the interfiber bonding ratio of the 15% outermost portion of the molded object in the thickness direction and the interfiber bonding ratio of the ±15% portion in the center of the molded object in the thickness direction is less than 10%.

Herein, the molded object may have the difference in the interfiber bonding ratio of the 15% outermost portion of the molded object in the thickness direction and the interfiber bonding ratio of the ±15% portion in the center of the molded object in the thickness direction is less than 5%.

Herein, the molded object may have a thermal conductivity (TC, W/m·K) and an apparent density (AD, g/cm$^3$) that satisfy equation 1 below.

$$AD/TC \geq 8 \qquad \text{[Equation 1]}$$

Herein, the molded object may have the thermal conductivity of 0.03 to 0.075 W/m·K.

Herein, the molded object may have a ratio between major axis and minor axis of polyester-based fiber (L/D: Aspect Ratio) in a range of 1000 to 3000.

Herein, the molded object may have a ratio between major axis and minor axis of polyester-based fiber (L/D: Aspect Ratio) in a range of 1500 to 2500.

Herein, the polyester-based fiber may be any one or more selected from the group consisting of polyethylene terephthalate (PET), polytrimethylene terephthalate, polybutylene terephthalate and polyethylene naphthalate.

Herein, the binder may have a melting point of 160° C. or higher.

Herein, the molded object may further include a sheath-core type bicomponent fiber including a core part of a polyester-based fiber; and a sheath part that is a non-hygroscopic copolymer resin surrounding the core part.

According to another aspect of the present invention, there is provided a method for manufacturing a molded object including a) preparing a non-woven fabric by mixing (A) a polyester-based fiber and (B) a sheath-core type bicomponent fiber including a core part of a polyester-based fiber and a sheath part that is a non-hygroscopic copolymer resin surrounding the core part, and then heating and pressurizing the result; b) installing the prepared non-woven fabric on a plurality of unwinding devices, and then moving to a heating press; and c) manufacturing a molded object by heating and pressurizing a plurality of the non-woven fabrics moved to the heating press under a temperature condition of 170° C. to 210° C. and a pressure condition of 1 MPa to 10 MPa.

Herein, the method may further include, between b) and c), d) preheating for 3 minutes to 10 minutes under a temperature condition of 160° C. to 210° C.

Herein, in a), (A) the polyester-based fiber and (B) the sheath-core type bicomponent fiber, including a core part of a polyester-based fiber and a sheath part that is a non-hygroscopic copolymer resin surrounding the core part, may be mixed in a weight ratio of 1:99 to 70:30.

Herein, the number of a plurality of the non-woven fabrics may be from 2 to 10.

Herein, the molded object may be manufactured to a thickness of 5 mm to 7 mm.

Herein, the molded object may be used in structural members for home appliances; interior and exterior boards for construction; automotive interior and exterior materials; interior and exterior materials for trains, ships and airplanes; partition boards; or elevator structural members.

According to still another aspect of the present invention, there is provided a sandwich panel including the molded object.

Advantageous Effects

A molded object according to the present invention has high density and enhanced properties such as flexural strength or tensile strength, has a small weight change caused by moisture absorption even when used for a long period of time, and has small changes in flexural strength, tensile strength and the like, and therefore, is suited to be used in structural members for home appliances (TV back covers, boards for washing machines, and the like), interior and exterior boards for construction, automotive interior and exterior materials, interior and exterior materials for trains/ships/airplanes, various partition boards, elevator structural members, panels used to form shipping containers, and the like.

DESCRIPTION OF DRAWINGS

FIG. 1 is an image observing a molded object according to the present invention using Field Emission-Scanning Electron Microscopy (FE-SEM).

FIG. 2 is a schematic diagram of a sandwich panel according to the present invention.

FIG. 3 is a schematic view showing an edge portion and a center portion of a molded article according to the present invention.

BEST MODE

Hereinafter, embodiments of the present invention will be described in detail with reference to accompanying drawings so that those skilled in the art may readily implement the present invention. However, the present invention may be embodied in various different forms, and is not limited to the embodiments described herein.

Molded Object

The present invention provides a molded object having a non-woven fiber structure, the molded object including a polyester-based fiber and a binder, wherein the binder is a non-hygroscopic copolymer resin, all or a part of the polyester-based fiber is fused by the binder, natural pores are included inside the molded object, and the molded object has apparent density of 0.5 g/cm³ to 0.8 g/cm³, flexural strength of 20 MPa or greater and tensile strength of 50 MPa to 80 MPa.

Based on experimental results of the inventors of the present invention, molded objects using a hygroscopic resin as a binder and manufactured using a wet process have had problems when used in structural members for home appliances (TV back covers, boards for washing machines, and the like), interior and exterior boards for construction, automotive interior and exterior materials, interior and exterior materials for trains/ships/airplanes, various partition boards, elevator structural members and the like since the manufactured molded objects have declined properties such as flexural strength or tensile strength, and experience severe changes in various properties when used for a long period of time under a high temperature and high humidity environment.

However, by manufacturing a molded object using a non-hygroscopic copolymer resin as a binder and using a dry process, the inventors of the present invention have manufactured a molded object suited to be used as household materials, industrial materials or the like with the manufactured molded object having improved properties such as flexural strength or tensile strength, and also having almost no changes in various properties even when used for a long period of time under a high temperature and high humidity environment. A dry process used in the present invention, refers to a process in which hot water vapor is not used in the process. The dry process may be used without limitation as long as the polyester fiber and the binder can be combined with each other by heating to a temperature above the melting point of the binder in a high temperature oven.

The molded object according to the present invention has a non-woven fiber structure including a polyester-based fiber and a binder. The molded object of the present invention has a non-woven fiber structure in which fibers are entangled with each other, and therefore, air permeability becomes favorable and weight lightening may be enhanced since natural pores are included inside the molded object. In other words, natural pores formed by fibers being entangled with each other are included, and unlike cases of artificially forming pores by an additive such as a foaming agent, manufacturing costs may be reduced, and a foaming process may not be included, thus increasing process efficiency.

An average length of the polyester-based fiber included in the molded object according to the present invention is preferably from 5 mm to 100 mm. When an average length of the fiber is less than 5 mm, an effect of high elongation may be difficult to expect due to the short fiber length. On the contrary, when the average length is greater than 100 mm, the content of the fiber entangled with each other increases reducing space occupied by the gap in the molded object. In addition, when the average length is greater than 100 mm, fiber dispersion is not smooth when manufacturing the molded object, which may decline properties of the molded object.

The ratio between major axis and minor axis of polyester-based fiber (L/D: Aspect Ratio) of the molded object according to the present invention is a range of 1000 to 3000. Also, the ratio between major axis and minor axis of polyester-based fiber (L/D: Aspect Ratio) may preferably be a range of 1500 to 2500. If the major axis and minor axis of polyester-based fiber exceeds 3000, the flexural strength and the maximum load become poor. If the major axis and minor axis of polyester-based fiber is less than 1000, the number of regions to be bonded between the fibers decreases. Therefore, if the above range is not satisfied, there is a problem in securing mechanical strength, such as inability to secure a flexural strength or a maximum load enough for use in living materials or industrial materials.

The binder included in the molded object according to the present invention is a non-hygroscopic copolymer resin.

The non-hygroscopic copolymer resin used in the present invention refers to a resin having properties of not absorbing moisture in the air. The non-hygroscopic copolymer resin used in the present invention is not particularly limited as long as it has a non-hygroscopic property, and as specific examples, PS(Polystyrene), PVC(Poly(vinyl chloride)), PMMA(Poly(methyl methacrylate)), ABS(acrylonitrile butadiene styrene copolymer), PP(Polypropylene), PE(polyethylene) and the like may be used.

Specifically, based on the molded object of the present invention manufactured using the resin, those having a molded object weight change rate (that is, a rate of increase in the moisture amount) of less than 0.1%, preferably less than 0.08%, and more preferably less than 0.07%, after being left unattended for 100 hours at a temperature of 85° C. and relative humidity of 85% may be used.

As a hygroscopic degree of a PET fiber included in a molded object is generally less than 0.05%, the molded object weight change rate being greater than 0.05% means that the amount of moisture absorbed by the binder, another constitution in the molded object, is quite large. In such an aspect, the non-hygroscopic copolymer resin used in the present invention means having a low absorption rate, such that, in a finally manufactured molded object, the molded object weight change rate (that is, a rate of increase in the moisture amount) is less than 0.1%, preferably less than 0.08%, and more preferably less than 0.07%, after being left unattended for 100 hours at a temperature of 85° C. and relative humidity of 85%.

As such a non-hygroscopic copolymer resin, those prepared by copolymerizing a polyester-based fiber, together with a diol-based monomer having high crystallinity and excellent elasticity and an acid component capable of providing flexibility, and satisfying the absorption rate may be used.

Specifically, as the polyester-based fiber, any one or more selected from the group consisting of polyethylene terephthalate (PET), polytrimethylene terephthalate, polybutylene terephthalate and polyethylene naphthalate may be used, and as the diol-based monomer, any one or more selected from the group consisting of neopentyl glycol, diethylene glycol, ethylene glycol, poly(tetramethylene)glycol, 1,4-butanediol, 1,3-propanediol, 1,6-hexanediol, 1,4-cyclohexanedimethanol and the like may be used, and as the acid component, any one or more selected from the group consisting of isophthalic acid, adipic acid, 2,6-naphthalenedicarboxylic acid, sebacic acid, succinic acid and the like may be used.

All or a part of the polyester-based fiber included in the molded object according to the present invention is fused by the binder that is a non-hygroscopic resin, and the binder may have a melting point of 160° C. or higher.

The molded object according to the present invention has apparent density of 0.5 g/cm³ to 0.8 g/cm³. By satisfying the density range, mechanical strength sufficient to be used in packing materials of large cargos, consumer products, industrial materials and the like may be obtained.

Specifically, the molded object according to the present invention has excellent mechanical strength with flexural strength of 20 MPa or greater and tensile strength of 50 MPa to 80 MPa. Flexural strength of the molded object is measured based on the ASTM D790, and tensile strength of the molded object is measured based on the ASTM D638.

In addition, the molded object according to the present invention has excellent mechanical rigidity with flexural modulus in a range of 1.0 GPa to 1.5 GPa and tension stiffness in a range of 1.0 GPa to 1.8 GPa. Flexural modulus of the molded object is measured based on the ASTM D790, and tension stiffness of the molded object is measured based on the ASTM D638.

The molded object according to the present invention has tensile elongation in a range of 10% to 30% and peel-off strength in a range of 150 N to 200 N, and thereby has an advantage of being not readily torn even when external force is applied. Tensile elongation of the molded object is measured based on the ASTM D638 and peel-off strength of the molded object is measured based on the KSF 4737.

In addition, the molded object according to the present invention has a flexural strength change rate of less than 10%, preferably less than 5% after keeping a constant temperature/constant humidity for 100 hours at a temperature of 85° C. and relative humidity of 85%.

In addition, the molded object according to the present invention has a weight change rate of less than 0.1%, preferably less than 0.08% after keeping a constant temperature/constant humidity for 100 hours at a temperature of 85° C. and relative humidity of 85%.

In the case of a molded object produced using a conventional hygroscopic resin as a binder, the binder which fuses the fibers in the nonwoven fiber absorbs moisture penetrating into the molded body as it is used for a long time in a high temperature and high humidity environment, the binding property of the binder is lowered due to the reaction with moisture, thereby lowering the interfiber adhesion rate and lowering the flexural strength and tensile strength.

However, since the molded object according to the present invention is produced by using a non-hygroscopic resin as a binder in a dry process rather than a wet process, even if it is used for a long time in a high temperature and high humidity environment, the change in weight due to moisture absorption is small. Therefore there was no problem resulting from the lowering of the strength and the like.

The interfiber bonding ratio refers to the ratio of the fibers fused by the binder in forming the nonwoven fabric structure by fusion of the polyester fibers in the formed body by the binder.

Further, in the molded object according to the present invention, the difference in the interfiber bonding ratio of the 15% outermost portion of the molded object in the thickness direction and the interfiber bonding ratio of the ±15% portion in the center of the molded object in the thickness direction is less than 10%, preferably less than 5%.

In the case of a molded object produced by a conventional wet process, since many fibers are entangled due to the characteristics of the non-woven fiber, water vapor having heat energy is not sufficiently transferred to the inside of the molded object. As a result, the difference between the density of the surface portion and the interfiber adhesion ratio in the central portion is 10% or more.

The molded object according to the present invention is characterized in that the density of the 15% outermost portion in the thickness direction of the formed article and the difference in density of the ±15% portion in the central portion in the thickness direction of the formed article are less than 3%, preferably less than 1%.

In the molded object according to the present invention, the outermost 15% portion in the thickness direction means the surface portions (edge portions) of the molded object as shown in FIG. 3, which are the portions from the outermost surface of each side and extending inwardly by 15% of the thickness of the object. The ±15% portion at the center in the thickness direction means the center portion of the molded object as shown in FIG. 3, which means the central portion extending from the center of the formed body upward by 15% and downward by 15% of the thickness of the object.

In the case of a molded object produced by a conventional wet process, since many fibers are entangled due to the characteristics of the non-woven fiber, water vapor having heat energy is not sufficiently transferred to the inside of the molded object. Unlike the case where the density difference is large, the molded object according to the present invention can be produced by using a non-hygroscopic resin as a binder in a dry process, not a wet process, so that the difference between the density of the surface portion and the density of the center portion can be less than 3%.

The molded object according to the present invention is characterized in that the difference between the thermal conductivity of the outermost 15% portion in the thickness direction of the formed article and the difference in thermal conductivity of the ±15% portion in the central portion of the formed article in the thickness direction is less than 10%, preferably less than 5%.

In the case of a molded object produced by a conventional wet process, since many fibers are entangled due to the characteristics of the non-woven fiber, water vapor having heat energy is not sufficiently transferred to the inside of the molded object. Since the difference in the degree of fusion between the outside and the inside is large, a uniform thermal conductivity cannot be exhibited depending on the position in the molded object, and thus, a sufficient heat shielding effect has not been exhibited. However, since the molded object according to the present invention is produced by using a non-hygroscopic resin as a binder in a dry process rather than a wet process, it is possible to uniformly bond the fibers and the binder in the entire molded object structure. Therefore, there is no difference of the thermal conductivity between the outer surface of the molded object and the inner center, and it is possible to have a more excellent heat blocking effect.

The molded object according to the present invention may have a thermal conductivity of 0.03 to 0.075 W/mK. Since the molded object has the low thermal conductivity as described above, the heat insulating property is improved. However, in order to lower the thermal conductivity of the conventional molded body, a method of lowering the apparent density of the molded body is used. However, if the apparent density is lowered, problems such as bending strength, tensile strength, bending rigidity, tensile rigidity and tensile elongation are made worse.

Unlike the conventional molded object, the molded object according to the present invention has a thermal conductivity (TC, W/m·K) and an apparent density (AD, g/cm$^3$) that satisfy equation 1 below.

$$AD/TC \geq 8 \qquad \text{[Equation 1]}$$

(where the unit of thermal conductivity is W/m·K, and the unit of apparent density is g/cm$^3$). In addition, due to the apparent density satisfying a range as high as 0.5 to 0.8 g/cm3, the resulting product will have sufficient mechanical strength (flexural strength, Tensile strength, flexural rigidity, tensile stiffness and tensile elongation, etc.) so as to be used for consumer products, industrial materials and the like.

The molded object according to the present invention satisfies such mechanical strength, and therefore, may be used as structural members for home appliances (TV back covers, boards for washing machines, and the like), interior and exterior boards for construction, automotive interior and exterior materials, interior and exterior materials for trains/ships/airplanes (boards such as partitions), various partition boards, elevator structural members, panels used to form shipping containers, and the like.

The molded object according to the present invention may further include a sheath-core type bicomponent fiber. The sheath-core type bicomponent fiber includes a core part of a polyester-based fiber; and a sheath part that is a non-hygroscopic copolymer resin surrounding the core part. The sheath-core type bicomponent fiber may be included in the molded object according to the present invention by the resin of the sheath part remaining un-melted in the fiber introduced in the step of manufacturing the molded object according to the present invention.

As the core part of a polyester-based fiber in the sheath-core type bicomponent fiber, any one or more selected from the group consisting of polyethylene terephthalate (PET), polytrimethylene terephthalate, polybutylene terephthalate and polyethylene naphthalate may be used.

As the sheath part in the sheath-core type bicomponent fiber, the same non-hygroscopic copolymer resin as the binder included in the molded object according to the present invention may be used.

Specifically, the non-hygroscopic copolymer resin refers to a resin having properties of not absorbing moisture in the air, and specifically, based on the molded object of the present invention manufactured using the resin, those having a molded object weight change rate (that is, a rate of increase in the moisture amount) of less than 0.1%, preferably less than 0.08% and more preferably less than 0.07% after being left unattended for 100 hours at a temperature of 85° C. and relative humidity of 85% may be used.

As a hygroscopic degree of a PET fiber included in a molded object is generally less than 0.05%, the molded object weight change rate being greater than 0.05% means that the amount of moisture absorbed by the binder, another constitution in the molded object, is quite large. In such an aspect, the non-hygroscopic copolymer resin used in the present invention means having a low absorption rate, such that, in a finally manufactured molded object, the molded object weight change rate (that is, a rate of increase in the moisture amount) is less than 0.1%, preferably less than 0.08%, and more preferably less than 0.07%, after being left unattended for 100 hours at a temperature of 85° C. and relative humidity of 85%.

As such a non-hygroscopic copolymer resin, those prepared by copolymerizing a polyester-based fiber, together with a diol-based monomer having high crystallinity and excellent elasticity and an acid component capable of providing flexibility, and satisfying the absorption rate may be used.

Specifically, as the polyester-based fiber, any one or more selected from the group consisting of polyethylene terephthalate (PET), polytrimethylene terephthalate, polybutylene terephthalate and polyethylene naphthalate may be used, and as the diol-based monomer, any one or more selected from the group consisting of neopentyl glycol, diethylene glycol, ethylene glycol, poly(tetramethylene)glycol, 1,4-butanediol, 1,3-propanediol, 1,6-hexanediol, 1,4-cyclohexanedimethanol and the like may be used, and as the acid component, any one or more selected from the group consisting of isophthalic acid, adipic acid, 2,6-naphthalenedicarboxylic acid, sebacic acid, succinic acid and the like may be used.

The sheath-core type bicomponent fiber is prepared using the core part component and the sheath part component through melt spinning and elongating.

In addition, when using the non-hygroscopic resin as the sheath component of the sheath-core type bicomponent fiber, flexural strength and tensile strength are enhanced, and the molded object may be manufactured using a dry process, and therefore, a high density molded object is readily manufactured. In addition, when used in packing materials of large cargos and the like, properties and shape maintaining properties are favorable even under high temperature and high humidity atmosphere, and therefore, sagging of a non-woven fabric may be prevented.

In addition thereto, the molded object according to the present invention may further include a filler such as a glass fiber, a carbon fiber or a polymer fiber. In addition, a flame retardant such as a bromine-based organic flame retardant may be further included. Additives such as an impact modifier or heat stabilizer may be further included in addition thereto.

Method for Manufacturing Molded Object

A method for manufacturing a molded object according to the present invention may be carried out as follows.

The method for manufacturing a molded object according to the present invention may include, a) preparing a non-woven fabric by mixing (A) a polyester-based fiber and (B) a sheath-core type bicomponent fiber including a core part of a polyester-based fiber and a sheath part that is a non-hygroscopic copolymer resin surrounding the core part, and then heating and pressurizing the result; b) installing the prepared non-woven fabric on a plurality of unwinding devices, and then moving to a heating press; and c) manufacturing a molded object by heating and pressurizing a plurality of the non-woven fabrics moved to the heating press under a temperature condition of 170° C. to 210° C. and a pressure condition of 1 MPa to 10 MPa.

First, in a), a non-woven fabric is prepared by mixing (A) a polyester-based fiber and (B) a sheath-core type bicomponent fiber including a core part of a polyester-based fiber and a sheath part that is a non-hygroscopic copolymer resin surrounding the core part, and then heating and pressurizing the result.

In a), (A) the polyester-based fiber and B) the sheath-core type bicomponent fiber may be mixed in a weight ratio of 1:99 to 80:20, and used. When the content of B) the sheath-core type bicomponent fiber is less than the above-mentioned range, fusion between fibers is not sufficient, thus declining properties of the non-woven fabric.

In a), common methods of preparing a non-woven fabric may be used as the method of preparing the non-woven fabric through heating and pressurizing, and as one example, the non-woven fabric may be prepared by carding mixed fibers using a roller carding machine, and then thermal bonding the result for 5 seconds to 30 seconds at a temperature of 160° C. to 210° C. using a heating press.

Next, in b), the prepared non-woven fabric is installed on a plurality of unwinding devices, and then moved to a heating press.

After installing 2 to 10 of the non-woven fabrics prepared in b) on a plurality of unwinding devices matching the number, the non-woven fabrics may be moved to a heating press for manufacturing a molded object. When using a plurality of non-woven fabrics using a plurality of unwinding devices as above, the thickness of each of the non-woven fabrics becomes small, and the length of the non-woven fabric wound on one unwinding device becomes long. Accordingly, the number of the use of joining machine for linking the non-woven fabrics continuously introduced during a continuous process may be reduced leading to an advantage of simplifying the process.

Then, in c), a plurality of the non-woven fabrics moved to the heating press are heated and pressurized under a temperature condition of 170° C. to 210° C. and a pressure condition of 1 MPa to 10 MPa to manufacture a molded object. The temperatures being less than 170° C. has a problem in that the binder is not sufficiently dissolved, making it difficult to achieve a strong bonding force, and the temperatures being greater than 210° C. has a problem in that it is difficult to achieve the desired thickness due to excessively high temperatures. The pressure being less than 1 MPa has a problem in that the pressure is insufficient, making it difficult to achieve a desired thickness and a desired internal bonding force, and the pressure being greater than 10 MPa has a problem in that it makes the thickness lower than a desired thickness, and thickness control is difficult.

The heating press used in c) is not particularly limited as long as it is commonly used in the art, and as one specific example, a double belt press and the like may be used.

The molded object manufactured in c) may be manufactured to a thickness of 0.1 mm to 10 mm. The thickness being less than 0.1 mm has a problem in that excellent mechanical strength is difficult to maintain, and the thickness being greater than 10 mm has a problem in that moldability declines when bending the molded object or when deep drawing molding. Properties of the manufactured molded object are the same as the properties of the molded object of the present invention described above.

In addition, the method for manufacturing a molded object according to the present invention may further include, between b) and c), d) preheating for 3 minutes to 10 minutes under a temperature condition of 160° C. to 210° C.

When further including preheating as above, heat energy is applied in advance to the non-hygroscopic copolymer resin of the sheath part of the sheath-core type bicomponent fiber in the non-woven fabric, and therefore, there is an advantage in that the time of the heating and pressurizing process in c) may be shortened.

Sandwich Panel

The present invention provides a sandwich panel including the molded object.

When referring to FIG. 2, the sandwich panel according to the present invention includes a core layer (10) formed with the molded object according to the present invention; a skin layer (20) laminated on one or more surfaces of the core layer; and an adhesive layer adhering the core layer and the skin layer.

The core layer (10) of the sandwich panel according to the present invention is formed with the molded object according to the present invention described above. The thickness of the core layer is preferably from 0.1 mm to 10 mm. The thickness being less than 0.1 mm has a problem in that excellent mechanical strength is difficult to maintain, and the thickness being greater than 10 mm has a problem in that moldability declines when bending the sandwich panel or when deep drawing molding.

The skin layer (20) of the sandwich panel according to the present invention may be formed with a metal material, and may preferably include any one or more selected from the group consisting of aluminum, iron, stainless steel (SUS), magnesium and electro galvanized iron (EGI). As one example, in order to have excellent moldability and flexural modulus, a skin layer (20) including electro galvanized iron (EGI) may be used in the sandwich panel. In addition, for weight lightening, a skin layer (20) including aluminum may be used in the sandwich panel.

The thickness of the skin layer (20) may be from 0.1 mm to 0.5 mm. When the thickness is less than 0.1 mm, structural rigidity of the skin layer is difficult to maintain, and the thickness being greater than 0.5 mm has problems of reducing a weight lightening effect of the sandwich panel, and increasing raw material costs.

The adhesive layer of the sandwich panel according to the present invention is coated between the core layer (10) and the skin layer (20) to adhere the core layer (10) and the skin layer (20). The adhesive layer is preferably coated to a uniform thickness considering viscosity. In the present invention, the sandwich panel may be manufactured by laminating the core layer (10) and the skin layer (20), and then curing the result. Herein, during the process of curing, an adhesive grows into the core layer (10) producing mechanical bonding as well as chemical bonding with components forming the core layer (10), which results in an effect of enhancing adhesive strength between the skin layer (20) and the core layer (10). The chemical bonding means the adhesive forming covalent bonds, hydrogen bonds, Van der Waals bonds, ionic bonds and the like with an upper surface and a lower surface of the core layer.

The mechanical bonding means the adhesive being, while penetrating into the core layer, physically hooked like rings being hooked to each other. Such a form is also referred to as mechanical interlocking. By the natural pores included in the core layer, the adhesive penetrates into an upper surface and a lower surface of the core layer.

The adhesive forming the adhesive layer may include one or more types of olefin-based adhesives, urethane-based adhesives, acryl-based adhesives and epoxy-based adhesives. As the olefin-based adhesive, one or more types selected from the group consisting of polyethylene, polypropylene and amorphous polyalphaolefin adhesives may be used. The urethane-based adhesive may be used without limit as long as it is an adhesive including a urethane structure (—NH—CO—O—). The acryl-based adhesive may include one or more types of polymethyl methacrylate adhesives, hydroxyl group-containing polyacrylate adhesives and carboxyl group-containing polyacrylate adhesives. The epoxy-based adhesive may include one or more types of bisphenol-A-type epoxy adhesives, bisphenol-F-type epoxy adhesives, novolac epoxy adhesives, linear aliphatic epoxy adhesives (linear aliphatic epoxy resins) and cycloaliphatic epoxy adhesives (cycloaliphatic epoxy resins).

In addition, the adhesive may include photocurable adhesives, hot melt-type adhesives or heat curable adhesives, and may use any one of photocuring methods and heat curing methods. For example, the sandwich panel may be manufactured by heat curing a laminate including the skin layer, the core layer and the adhesive. The heat curing may be carried out for approximately 5 hours to 2 hours at 50° C. to 110° C., a curing temperature of an epoxy resin, and the curing may also be carried out for 1 hour to 10 hours at room temperature.

The adhesive layer may be coated to a thickness of approximately 20 μm to 300 μm, however, the thickness is not limited thereto.

The method of coating the adhesive layer on one surface of the skin layer may use any one method selected from among a die coating method, a gravure coating method, a knife coating method or a spray coating method.

The sandwich panel according to the present invention is formed by, for example, consecutively laminating the skin layer, the core layer and the skin layer. Curing and pressing may be carried out after the lamination, however, the formation is not limited thereto.

As described above, by using a molded object exhibiting favorable mechanical properties, the sandwich panel according to the present invention has excellent moldability as well as mechanical strength. In addition, the sandwich panel has high density and enhanced properties such as flexural strength or tensile strength, has a small weight change caused by moisture absorption even when used for a long period of time, and has small changes in flexural strength, tensile strength and the like, and therefore, is suited to be used as structural members for home appliances (TV back covers, boards for washing machines, and the like), interior and exterior boards for construction, automotive interior and exterior materials, interior and exterior materials for trains/ships/airplanes (boards such as partitions), various partition boards, elevator structural members, panels used to form shipping containers, and the like.

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also belong to the attached claims.

EXAMPLE

Examples 1 to 3 and Comparative Examples 1 to 4

(1) Manufacture of Molded Object

Example 1

After preparing a polyethylene terephthalate (PET) fiber (Toray Chemical Inc., RPF, fineness 4 denier, fiber length 51 mm) and a sheath-core type PET fiber in which a sheath part is a non-hygroscopic resin (Toray Chemical Inc., EZBON-L, fineness 4 denier, sheath part melting point 164° C., fiber length 64 mm), these were mixed in a weight ratio of 30:70.

The mixed fiber went through carding using a roller carding machine, and thermally bonded for 10 seconds at a temperature of 190° C. using a heating press to prepare a non-woven fabric.

After installing the non-woven fabric on 6 unwinding devices, the 6 non-woven fabrics were introduced to a preheating chamber having an inside chamber temperature of 180° C., and then preheated for 3 minutes.

After that, the non-woven fabrics were transferred to a double belt press at a rate of 5 m/minute. Herein, a heating temperature of the double belt press was 180° C. and the pressure was 5 MPa, and heating/pressurizing treatment was carried out for 2 minutes to manufacture a molded object having a thickness of 5.5 mm.

Example 2

A molded object was manufactured in the same manner as in Example 1 except that the polyethylene terephthalate (PET) fiber and the sheath-core type PET fiber in which a sheath part is a non-hygroscopic resin were mixed in a weight ratio of 50:50.

Example 3

A molded object was manufactured in the same manner as in Example 1 except that a sheath-core type PET fiber in which a sheath part is a non-hygroscopic resin (Toray Chemical Inc., EZBON-L, fineness 4 denier, sheath part melting point 110° C., fiber length 64 mm) was used.

Comparative Example 1

A polyethylene terephthalate (PET) fiber (Toray Chemical Inc., RPF, fineness 4 denier, fiber length 51 mm) went through carding using a roller carding machine and thermally bonded for 10 seconds at a temperature of 190° C. using a heating press to prepare a non-woven fabric.

After preparing 7 of the non-woven fabrics, a polyester-based hot melt adhesive film (Chemitec Korea, Co. Ltd., PE) that is a hygroscopic copolymer was placed between each of the non-woven fabrics, and the non-woven fabrics were transferred to a double belt press at a rate of 5 m/minute. Herein, a heating temperature of the double belt press was 110° C. and the pressure was 5 MPa, and heating/pressurizing treatment was carried out for 2 minutes to manufacture a molded object having a thickness of 5.5 mm.

Comparative Example 2

After mixing a glass fiber to a polyethylene terephthalate (PET) fiber (Toray Chemical Inc., RPF, fineness 4 denier, fiber length 51 mm) in a weight ratio of 1:1, the result went through carding using a roller carding machine to prepare a card web, and then after overlapping 6 of these webs, the result was transferred to a conveyer belt equipped with a steam spray nozzle. After that, high temperature steam was sprayed from the steam spray nozzle in a thickness direction of the card web, and the result was passed through a web thickness adjusting roll to manufacture a molded object having a thickness of 5.5 mm.

Comparative Example 3

A molded object was manufactured in the same manner as in Example 1 except that the heating temperature of the double belt press was employed to be 160° C.

Comparative Example 4

A molded object was manufactured in the same manner as in Example 1 except that the pressure of the double belt press was employed to be 0.5 MPa.

Experimental Example 1: Measurements on Molded Object Properties

After preparing each of the molded objects manufactured in Examples 1 to 3 and Comparative Examples 1 to 4 into a specimen, measurements were made using the following methods, and the results are shown in the following Table 1.

(1) Density (g/cm$^3$) and porosity (%):

After preparing a specimen by cutting to a size of 15 mm×15 mm×1 mm, density was measured 3 times using an electronic gravimeter (VIBRA, DME-220E), and the average value was measured. Subsequently, using the density of each specimen, porosity was deduced by the following general formula.

Porosity (%)={1−(specimen density/raw material density)}×100  [General Formula]

(2) Flexural strength (MPa) and flexural modulus (GPa): measurements were made 3 times based on the ASTM D790, and the average value was measured.

(3) Tensile strength (MPa), tension stiffness (GPa) and tensile elongation (%): measurements were made 3 times based on the ASTM D638, and the average value was measured.

(4) Peel-off strength (N): measurements were made 3 times based on the KSF 4737, and the average value was measured.

TABLE 1

|  | Example | | | Comparative Example | | | |
| --- | --- | --- | --- | --- | --- | --- | --- |
|  | 1 | 2 | 3 | 1 | 2 | 3 | 4 |
| Thickness | 5.53 | 5.51 | 5.55 | 6.00 | 5.61 | 5.85 | 7.13 |
| Density | 0.63 | 0.64 | 0.63 | 0.58 | 0.84 | 0.60 | 0.49 |
| Density[1)] | 0.64 | 0.64 | 0.63 | 0.58 | 0.84 | 0.60 | 0.49 |
| porosity | 45.0% | 45.7% | 45.0% | 50.0% | 43.8% | 51.4% | 42.1% |
| Flexural Strength (MD) | 28.95 | 23.76 | 26.18 | 1.89 | 18.56 | 20.45 | 12.22 |
| Flexural Strength (MD)* | 6.08 | 2.05 | 2.71 | 0.68 | 1.72 | 4.82 | 3.60 |
| Flexural Strength (TD) | 32.93 | 25.03 | 27.56 | 2.17 | 20.78 | 21.71 | 13.24 |
| Flexural Strength (TD)* | 8.52 | 2.99 | 3.33 | 0.72 | 1.84 | 5.49 | 3.64 |
| Flexural Modulus | 1.24 | 0.92 | 1.01 | 0.04 | 0.81 | 1.01 | 0.72 |
| Tensile Strength | 110.89 | 101.24 | 103.59 | 58.03 | 150.44 | 83.26 | 52.54 |
| Tension Stiffness | 4.76 | 3.97 | 4.13 | 2.22 | 7.81 | 2.10 | 2.15 |
| Tensile Elongation | 35.53 | 34.91 | 35.12 | 21.06 | 2.03 | 31.56 | 19.63 |
| Peel-off Strength | 172.03 | 152.24 | 165.58 | 56.44 | 78.34 | 157.73 | 70.37 |

*Measured after being left unattended for 10 minutes at 80° C.

As shown in Table 1, it was seen that the molded objects manufactured in Examples 1 to 3 had excellent properties of flexural strength, flexural modulus, tensile strength, tension stiffness, tensile elongation and peel-off strength while having high density.

Meanwhile, it was seen that Comparative Examples 1 to 4 had inferior mechanical properties compared to the examples, and particularly, Comparative Example 1 using a hygroscopic copolymer was vulnerable to peel-off due to heterogeneous material bonding, and Comparative Example 2 manufactured using a wet process had a problem of a decrease in the bonding of the water-containing region and an increase in the molded object density caused by water-containing. Comparative Example 3 manufactured at a low heating temperature had a problem of being vulnerable to peel-off since the degree of fusion of the binder decreased, and Comparative Example 4 manufactured at a low pressure had a low pressure, and pressing was not properly obtained, and as a result, there was a problem of being vulnerable to peel-off as binding between fibers became weak due to low density.

Experimental Example 2: Measurements on Molded Object Properties

The molded body manufactured in Examples 1, 3 and Comparative Examples 1 and 2 was taken out to 0.8 mm of the outermost portion and 0.8 mm of the center portion to obtain a 15% outermost portion (surface portion) and a 15% portion (Central portion).

The physical properties of each sample were measured by the following methods, and the results are shown in the following Table 2.

TABLE 2

|  | Example 1 | | Example 3 | | Co. Ex. 1 | | Co. Ex. 2 | |
| --- | --- | --- | --- | --- | --- | --- | --- | --- |
|  | Central portion | surface portion | Central portion | surface portion | Central portion | surface portion | Central portion | surface portion |
| Thickness | 0.8 | 0.8 | 0.8 | 0.8 | 0.8 | 0.8 | 0.8 | 0.8 |
| Density | 0.672 | 0.672 | 0.651 | 0.658 | 0.651 | 0.680 | 0.631 | 0.669 |
| Difference of Density* | 0 | | 1.06 | | 4.5 | | 6.0 | |
| interfiber bonding ratio | 91 | 95 | 89 | 81 | 73 | 91 | 69 | 78 |
| Difference of interfiber bonding ratio** | 4 | | 8 | | 18 | | 19 | |

TABLE 2-continued

|  | Example 1 | | Example 3 | | Co. Ex. 1 | | Co. Ex. 2 | |
| --- | --- | --- | --- | --- | --- | --- | --- | --- |
|  | Central portion | surface portion | Central portion | surface portion | Central portion | surface portion | Central portion | surface portion |
| thermal conductivity | 0.06448 | 0.06193 | 0.06212 | 0.05887 | 0.09581 | 0.09817 | 0.0952 | 0.10201 |
| Difference of thermal conductivity*** | 3.95 | | 5.23 | | 12.51 | | 14.88 | |

*Difference of Density: {1 − (Central portion Density/surface portion Density)} × 100
**Difference of interfiber bonding ratio: surface portion bonding ratio (%) − Central portion bonding ratio (%)
***Difference of thermal conductivity: {1 − (surface portion thermal conductivity/Central portion thermal conductivity)} × 100

As shown in Table 2, in the molded object manufactured in Examples 1 and 3, the difference in density between the surface portion and the center portion was small, and the difference in the interfiber adhesion rate was also small. Therefore, it was found that the molded object has no difference in physical properties between the outer surface of the formed body and the inner central portion. On the other hand, Comparative Examples 1 and 2 manufactured by the wet process of the hygroscopic copolymer showed not only low mechanical strength but high heat capacity, even though the density was high.

Experimental Example 3: Measurements on Molded Object Properties

The molded body manufactured in Examples 1, 3 and Comparative Examples 1 and 2 were prepared as specimens and measured by the following methods. The results are shown in Table 3 below. The specimens were left for 7 days in a constant temperature and humidity chamber at 85° C. and 85% relative humidity, and then measured by the same method. The results are shown in Table 3 below.

(1) Density (g/cm$^3$):
The specimens were cut into a size of 15 mm×15 mm×1 mm and then the density was measured three times using an electronic specific gravity meter (VIBRA, DME-220E) and then measured by an average value.

(2) Weight (g):
The 250 mm×250 mm×5.5 mm specimens were dried in a 60° C. convection oven for 1 hour and then left to stand at 85° C. and 85% humidity for 100 hours. The weight was measured immediately after 100 hours.

(3) Flexural Strength (MPa) and Flexural Stiffness (GPa):
The 250 mm×250 mm×5.5 mm specimens were dried in a 60° C. convection oven for 1 hour and then left to stand at 85° C. and 85% humidity for 100 hours. After 100 hours, it was measured three times on the basis of ASTM D790, and then the average value was measured.

TABLE 3

|  | Example 1 | | Example 3 | | Co. Ex. 1 | | Co. Ex. 2 | |
| --- | --- | --- | --- | --- | --- | --- | --- | --- |
|  | initial | After 100 hours | initial | After 100 hours | initial | After 100 hours | initial | After 100 hours |
| Thickness | 5.52 | 5.53 | 5.54 | 5.55 | 5.52 | 5.54 | 5.54 | 5.55 |
| Density | 0.671 | 0.671 | 0.668 | 0.667 | 0.671 | 0.669 | 1.170 | 1.169 |
| Weight | 231.65 | 231.80 | 231.36 | 231.52 | 231.41 | 231.76 | 405.07 | 405.58 |
| Weight change rate* | 0.065 | | 0.069 | | 0.151 | | 0.126 | |
| Flexural Strength (MD) | 28.95 | 27.9 | 22.2 | 21 | 23.5 | 22.3 | 28.5 | 26.1 |
| change rate of Flexural Strength (MD)** | −3.76 | | −5.71 | | −5.38 | | −9.20 | |
| Flexural Strength (TD) | 29.8 | 28.5 | 28 | 26.6 | 24.2 | 22.7 | 31.1 | 27.4 |
| change rate of Flexural Strength (TD)** | −4.56 | | −5.26 | | −6.61 | | −13.50 | |

*Weight change rate (%): {(weight after 100 hours/initial weight) − 1} × 100
**Flexural Strength change rate (%): {(flexural strength after 100 hours/initial flexural strength) − 1} × 100

As shown in Table 3, it was found that the molded object manufactured in Examples 1 and 3 showed a very small decrease in flexural strength even though they were used for a long time in a high temperature and high humidity environment. On the contrary, Comparative Examples 1 and 2 manufactured by a wet process of the hygroscopic copolymer showed a significant decrease in flexural strength due to long-term use in a high temperature and high humidity environment. It was also found that, in the case of Comparative Examples 1 and 2 in which the hygroscopic copolymer was produced by a wet process, the weight change was larger than those in Examples 1 and 3 as it was used for a long time in a high temperature and high humidity environment.

Experimental Example 4: Measurements on Molded Object Properties

The molded body manufactured in Examples 1, 3 and Comparative Examples 1 and 2 were prepared as specimens and measured by the following methods. The results are shown in Table 4 below.

(1) Density (g/cm$^3$):

The specimens were cut into a size of 15 mm×15 mm×1 mm and then the density was measured three times using an electronic specific gravity meter (VIBRA, DME-220E) and then measured by an average value.

(2) Thermal Conductivity (W/mK)

The measurement was made using a thermal conductivity meter (model name: HC-074-200, manufactured by EKO) at an average temperature of 20±5° C. according to the measurement conditions of KS L 9016.

TABLE 4

|  | Example 1 | | Example 3 | | Co. Ex. 1 | | Co. Ex. 2 | |
| --- | --- | --- | --- | --- | --- | --- | --- | --- |
|  | 1st | 2nd | 1st | 2nd | 1st | 2nd | 1st | 2nd |
| Thickness | 5.53 | 5.52 | 5.55 | 5.53 | 5.54 | 5.53 | 5.55 | 5.54 |
| Density | 0.686 | 0.667 | 0.672 | 0.0672 | 0.623 | 0.617 | 0.631 | 0.637 |
| thermal conductivity | 0.07144 | 0.06891 | 0.06448 | 0.06193 | 0.09517 | 0.09811 | 0.10198 | 0.09891 |
| AD/TC | 9.602 | 9.679 | 10.42 | 10.85 | 6.546 | 6.289 | 6.187 | 6.440 |

As shown in Table 4, the molded object manufactured in Examples 1 and 3 has high density and excellent physical properties such as bending strength, bending rigidity, tensile strength, tensile strength, tensile elongation and peel strength. In addition, it has been found that since it has a low thermal conductivity while maintaining a high density, it exhibits excellent heat shielding ability while maintaining mechanical rigidity. On the contrary, Comparative Examples 1 and 2 manufactured by a wet process of a hygroscopic copolymer showed a low mechanical strength and a low heat capacity even though the density was high.

The invention claimed is:

1. A molded object having a non-woven fiber structure, the molded object comprising:
   a polyester-based fiber; and
   a binder,
   wherein the binder is a non-hygroscopic copolymer resin, all or a part of the polyester-based fiber is fused by the binder,
   wherein natural pores are included inside the molded object, and wherein the molded object has apparent density of 0.5 g/cm$^3$ to 0.8 g/cm$^3$, flexural strength of 20 MPa or greater, and tensile strength of 50 MPa to 80 MPa.

2. The molded object of claim 1, which has flexural modulus in a range of 1.0 GPa to 1.5 GPa, tension stiffness in a range of 1.0 GPa to 1.8 GPa, tensile elongation in a range of 10% to 30%, and peel-off strength in a range of 150 N to 200 N.

3. The molded object of claim 1, which has a weight change rate of less than 0.1% after keeping a constant temperature/constant humidity for 100 hours at a temperature of 85° C. and relative humidity of 85%.

4. The molded object of claim 1, which has a weight change rate of less than 0.08% after keeping a constant temperature/constant humidity for 100 hours at a temperature of 85° C. and relative humidity of 85%.

5. The molded object of claim 1, which has a flexural strength change rate of less than 10% after keeping a constant temperature/constant humidity for 100 hours at a temperature of 85° C. and relative humidity of 85%.

6. The molded object of claim 1, which has a flexural strength change rate of less than 5% after keeping a constant temperature/constant humidity for 100 hours at a temperature of 85° C. and relative humidity of 85%.

7. The molded object of claim 1, wherein the difference in the density of the 15% outermost portion of the molded object in the thickness direction and the density of the ±15% portion in the center of the molded object in the thickness direction is less than 3%, and
   the difference between the bonded fiber ratio of the 15% outermost portion of the molded object in the thickness direction and the bonded fiber ratio of the ±15% portion in the center of the molded object in the thickness direction is less than 10%.

8. The molded object of claim 1, wherein the difference in the density of the 15% outermost portion of the molded object in the thickness direction and the density of the ±15% portion in the center of the molded object in the thickness direction is less than 1%, and
   the difference between the bonded fiber ratio of the 15% outermost portion of the molded object in the thickness direction and the bonded fiber ratio of the ±15% portion in the center of the molded object in the thickness direction is less than 5%.

9. The molded object of claim 1, wherein the difference in the interfiber bonding ratio of the 15% outermost portion of the molded object in the thickness direction and the interfiber bonding ratio of the ±15% portion in the center of the molded object in the thickness direction is less than 10%.

10. The molded object of claim 1, wherein the difference in the interfiber bonding ratio of the 15% outermost portion of the molded object in the thickness direction and the interfiber bonding ratio of the ±15% portion in the center of the molded object in the thickness direction is less than 5%.

11. The molded object of claim 1, which has a thermal conductivity (TC, W/m·K) and an apparent density (AD, g/cm³) that satisfy equation 1 below.

$$AD/TC \geq 8 \qquad \text{[Equation 1]}$$

12. The molded object of claim 11, wherein the molded object has the thermal conductivity of 0.03 to 0.075 W/m·K.

13. The molded object of claim 1, which has a ratio between major axis and minor axis of polyester-based fiber (L/D: Aspect Ratio) is a range of 1000 to 3000.

14. The molded object of claim 1, which has a ratio between major axis and minor axis of polyester-based fiber (L/D: Aspect Ratio) is a range of 1500 to 2500.

15. The molded object of claim 1, wherein the polyester-based fiber is any one or more selected from the group consisting of polyethylene terephthalate (PET), polytrimethylene terephthalate, polybutylene terephthalate and polyethylene naphthalate.

16. The molded object of claim 1, wherein the binder has a melting point of 160° C. or higher.

17. The molded object of claim 1, further comprising a sheath-core type bicomponent fiber including a core part of a polyester-based fiber; and a sheath part which is a non-hygroscopic copolymer resin surrounding the core part.

18. The molded object of claim 17, wherein the polyester-based fiber is any one or more selected from the group consisting of polyethylene terephthalate (PET), polytrimethylene terephthalate, polybutylene terephthalate and polyethylene naphthalate.

19. A method for manufacturing the molded object of claim 1, comprising:
   a) preparing a non-woven fabric by mixing (A) a polyester-based fiber and (B) a sheath-core type bicomponent fiber including a core part of a polyester-based fiber and a sheath part that is a non-hygroscopic copolymer resin surrounding the core part, and then heating and pressurizing the result;
   b) installing the prepared non-woven fabric on a plurality of unwinding devices, and then moving to a heating press; and
   c) manufacturing a molded object by heating and pressurizing a plurality of the non-woven fabrics moved to the heating press under a temperature condition of 170° C. to 210° C. and a pressure condition of 1 MPa to 10 MPa.

20. The method for manufacturing a molded object of claim 19, further comprising, between b) and c), d) preheating for 3 minutes to 10 minutes under a temperature condition of 160° C. to 210° C.

21. The method for manufacturing a molded object of claim 19, wherein, in a), (A) the polyester-based fiber and (B) the sheath-core type bicomponent fiber, including a core part of a polyester-based fiber and a sheath part that is a non-hygroscopic copolymer resin surrounding the core part, are mixed in a weight ratio of 1:99 to 70:30.

22. The method for manufacturing a molded object of claim 19, wherein the number of a plurality of the non-woven fabrics is from 2 to 10.

23. The method for manufacturing a molded object of claim 19, which is manufactured to a thickness of 5 mm to 7 mm.

24. A device comprising the molded object of claim 1, wherein the device is a structural member for a home appliance; an interior or exterior board for construction; an automotive interior or exterior material; an interior or exterior material for a train, ship, or airplane; a partition board; or an elevator structural member.

25. A sandwich panel comprising the molded object of claim 1.

* * * * *